No. 868,347. PATENTED OCT. 15, 1907.
M. KLAR.
METHOD OF ELIMINATING TAR FROM GASEOUS PRODUCTS OF DRY DISTILLATION FOR THE PURPOSE OF PRODUCING ACETATE SOLUTIONS.
APPLICATION FILED SEPT. 16, 1905.
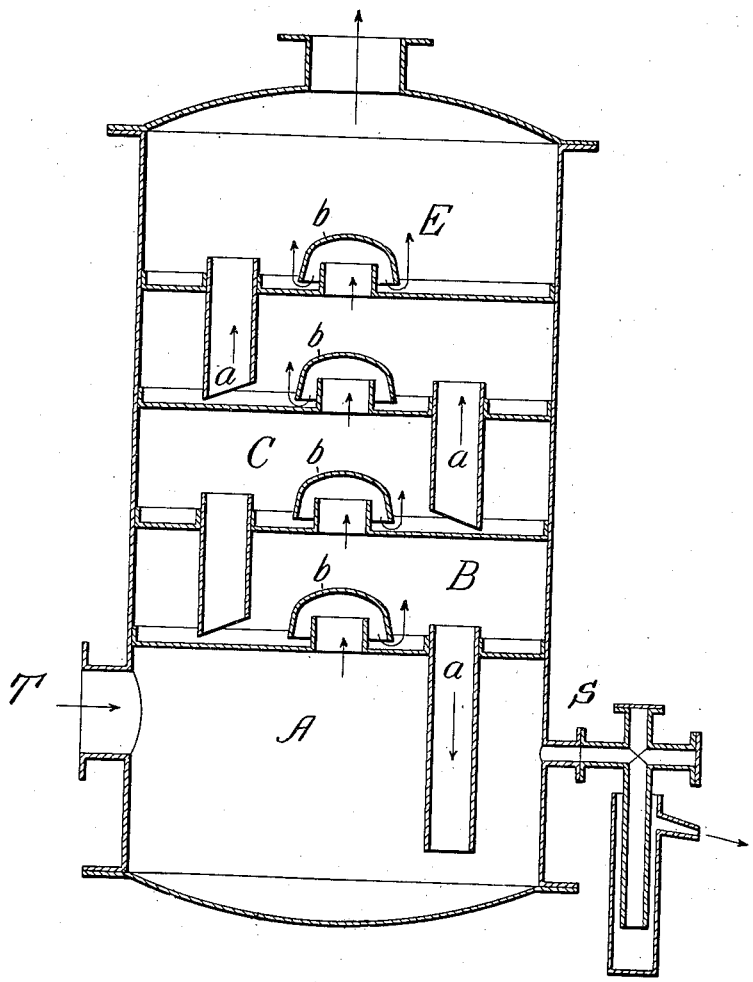

UNITED STATES PATENT OFFICE.

MAX KLAR, OF HANOVER, GERMANY.

METHOD OF ELIMINATING TAR FROM GASEOUS PRODUCTS OF DRY DISTILLATION FOR THE PURPOSE OF PRODUCING ACETATE SOLUTIONS.

No. 868,347.  Specification of Letters Patent.  Patented Oct. 15, 1907.

Application filed September 16, 1905. Serial No. 278,774.

*To all whom it may concern:*

Be it known that I, MAX KLAR, chemist, of Hanover, Germany, have invented new and useful improvements in a method of eliminating tar from gaseous products of dry distillation for the purpose of producing crude pyroligneous acid free from tar direct from the condensed vapors, of which the following is a specification.

I have discovered that the quantities of tar contained in the vapors from the still are completely eliminated from the stream of vapor and gas, by condensing a portion of the vaporous mixture after leaving the retort in an apparatus adjoining the retorts and consisting of compartments arranged above or adjoining each other, and by forcing the ascending or subsequently flowing mixture of vapors and gas in an atomized and uncondensed state repeatedly through the mixed products of condensation at different temperatures in the different compartments. In the first or lower compartment of the apparatus divided into compartments and arranged between retort and cooler, most of the tar which was contained in the vaporous mixture is collected, while from the last or uppermost compartment, gases and vapors escape which are absolutely free from tar, and of which the latter are then condensed in a cooler. Instead of using the product of the distillation gases condensed at the beginning of the process as washing liquor, the distillation gases may be compelled to pass from the beginning through washing liquors of similar composition containing decreasing quantities of tar and which are kept at such a temperature, perhaps a little over 230 degrees F. in order that no condensation of the vapors to be freed from tar may take place. In this manner, pyroligneous acid is obtained directly from the retort gases at almost no expense, and in the technical sense, entirely free from tar, and being neutralized with lime or other bases thus produces directly (that is to say without further distillation), gray pyroligneous ace-tact of lime of 80 to 82% or other acetates correspondingly free from tar.

To clearly illustrate the process forming the subject matter of my invention, I shall describe an apparatus by which the process may be carried out. Such an apparatus is shown in the accompanying drawing. Said drawing is a vertical section of an apparatus for the purposes of my invention.

The volatilized gases and vapors which come from the retort pass first through the short pipe T into a chamber A. In this chamber, the main portion of the tar contained in the mixture of gas and vapor condenses due to the radiation of its heat through the walls of the chamber. The condensed liquid in the cham-
ber A flows out through a liquid seal S, of well-known construction, when it reaches the level of the outlet seal. By reason of the condensation which has occurred, the vapors which leave the chamber A contain relatively less tar and more pyroligneous acid. The mixture of gas and vapor which escapes from A passes through a bell *b* or some other similar device into the next chamber B in which condensation again takes place resulting in the removal of still more of the tar which leaves the remaining vapor mixture correspondingly richer in the desired acid. The same process is repeated in subsequent chambers C, D and E, more and more of the tar being removed from the vaporized mixture with each particular condensation. A constant level is maintained in the chambers B, C, D and E by the use of overflow pipes *a*.

In the embodiment of my invention herein shown, there are different temperatures in the several chambers, the temperature of each chamber being proportional to the contents of tar, reckoned from the first chamber to the last. The liquid in the several chambers differs therefore in so far as in the first chamber there is little else than tar, in the second chamber B a mixture containing much tar and little acid, and in the chamber C, the proportion of tar is still less, while the acid constituent is greater, and finally in the last chamber there is practically no tar at all, but only acid.

The tar separator concerned in my application is located between the retorts and pyroligneous acid condensers at such distance from each that excessive heating of the fluid remaining in the separator cannot occur. The location of these separators is different for different plants, and must be determined previously by the corresponding temperature measurements. The dimensions of the cells of the tar separator have then to be chosen so that the gases and vapors will cool off while passing through the apparatus, owing to its cooling surface which is exposed to the air, so that the temperature of the gases and vapors when leaving the apparatus does not exceed 100° C. At the same time there is a natural tendency for the temperature to be regulated automatically by the contents of tar contained in the different retorts, in accordance with well known principles. It has been proved that this mixture of tar and pyroligneous acid, due to the decreasing tar contents and the decreasing temperature in the direction of flow of the gas current, has the property of entirely separating out the tar from the mixture of vapor and gas which subsequently passes out from the retort, during the passage of the last-named mixture through the washing liquids having decreasing contents of tar and decreasing temperature.

The special construction of the apparatus for carrying out the process, does not form the subject matter of the invention and the apparatus may be of any suitable construction. The different chambers may, for instance, be arranged side by side instead of one above the other. The illustration shown in the drawing is, therefore, merely to be considered an example.

I claim:

1. The method of separating tar from distillation gases which consists in passing the distillation gases still rich in tar through the distillate thereof.

2. The method of separating tar from distillation gases which consists in passing the distillation gases still rich in tar through a series of distillates thereof at progressively lower temperatures.

3. The method of directly separating tar from pyroligneous acid which consists in passing the pyroligneous acid which is still rich in tar through a series of chambers containing distillates thereof, the temperature of each corresponding to the composition of the distillate therein.

In witness whereof I have signed this specification in presence of two witnesses.

MAX KLAR.

Witnesses:
  LEONORE RASCH,
  HENRY J. FULLER.